US012128002B2

(12) United States Patent
Schwartz et al.

(10) Patent No.: US 12,128,002 B2
(45) Date of Patent: Oct. 29, 2024

(54) STEAM OUTLET SYSTEM

(71) Applicants: Joseph Schwartz, Hollywood, FL (US); Gunter Felix, Hialeah, FL (US)

(72) Inventors: Joseph Schwartz, Hollywood, FL (US); Gunter Felix, Hialeah, FL (US)

( * ) Notice: Subject to any disclaimer, the term of this patent is extended or adjusted under 35 U.S.C. 154(b) by 132 days.

(21) Appl. No.: 17/965,950

(22) Filed: Oct. 14, 2022

(65) Prior Publication Data

US 2024/0122799 A1 Apr. 18, 2024

(51) Int. Cl.
*A61H 33/06* (2006.01)

(52) U.S. Cl.
CPC ... *A61H 33/065* (2013.01); *A61H 2201/0107* (2013.01)

(58) Field of Classification Search
CPC ...................... A61H 33/065; A61H 2201/0107
USPC .......................... 4/535–538, 524, 675; 52/34
See application file for complete search history.

(56) References Cited

U.S. PATENT DOCUMENTS

| | | | | | |
|---|---|---|---|---|---|
| 2,590,026 | A * | 3/1952 | Marx | A61H 35/00 | 392/405 |
| 2,624,887 | A * | 1/1953 | Pessina | A61H 33/063 | 126/344 |
| 3,452,369 | A * | 7/1969 | Jones | A61H 33/06 | 219/400 |
| 3,685,060 | A * | 8/1972 | Bemberg | A61H 33/06 | 219/400 |
| 4,112,281 | A * | 9/1978 | Epps | F24H 1/182 | 237/19 |
| 4,277,855 | A * | 7/1981 | Poss | A61H 33/06 | 4/531 |
| 4,833,739 | A * | 5/1989 | Sakakibara | A61H 33/063 | 4/524 |
| 4,993,821 | A * | 2/1991 | Christianson | G02B 27/0006 | 4/597 |
| 5,032,015 | A * | 7/1991 | Christianson | G02B 27/0006 | 359/507 |
| 5,293,653 | A * | 3/1994 | Filipponi | A61H 33/063 | 4/524 |
| 5,805,765 | A * | 9/1998 | Altman | H05B 3/84 | 392/386 |
| 6,148,450 | A * | 11/2000 | Nicholas | A61H 33/06 | 607/81 |
| 6,339,854 | B1 * | 1/2002 | Amendt | A61H 33/06 | 607/83 |
| 6,745,412 | B1 * | 6/2004 | Egeresi | A61H 33/10 | 4/537 |
| 8,019,208 | B2 * | 9/2011 | Altman | A61H 33/065 | 392/485 |

(Continued)

FOREIGN PATENT DOCUMENTS

| | | | | |
|---|---|---|---|---|
| CN | 110030858 A * | 7/2019 | | |
| DE | 19607095 C1 * | 4/1997 | | B44C 7/027 |

(Continued)

*Primary Examiner* — Lori L Baker
(74) *Attorney, Agent, or Firm* — Mark H. Francis; Heath M. Sargeant; Holland & Knight LLP

(57) ABSTRACT

A steam outlet system may include, but is not limited to, a steam bar with at least one aperture for passing steam from a rear side to a front side of the steam bar. A front plate may be mounted to, and at a distance from, the front side of the steam bar. A steam diverting portion may extend the distance between the front side of the steam bar and the front plate over top edges of the at least one aperture.

20 Claims, 10 Drawing Sheets

(56) References Cited

U.S. PATENT DOCUMENTS

| | | | | |
|---|---|---|---|---|
| 8,381,326 | B2 * | 2/2013 | Rivas | A61H 33/063<br>4/524 |
| 11,779,515 | B2 * | 10/2023 | Urfig | A61H 33/067<br>4/535 |
| 2007/0113333 | A1 * | 5/2007 | Rivas | A61H 33/063<br>4/524 |
| 2008/0092287 | A1 * | 4/2008 | Salomonsson | A61H 33/063<br>392/360 |
| 2009/0300836 | A1 * | 12/2009 | Rivas | A61H 33/063<br>4/524 |
| 2012/0246820 | A1 * | 10/2012 | Huynh | A61H 35/006<br>4/524 |
| 2015/0150756 | A1 * | 6/2015 | Krasilnikov | A61H 33/067<br>4/524 |
| 2020/0306783 | A1 * | 10/2020 | Freier | B05B 15/5225 |

FOREIGN PATENT DOCUMENTS

| | | | | |
|---|---|---|---|---|
| DE | 202018101776 | U1 * | 9/2019 | B65B 53/063 |
| EP | 1484044 | A2 * | 12/2004 | A61H 33/063 |

* cited by examiner

STEAM OUTLET SYSTEM

TECHNICAL FIELD

The present disclosure generally relates to steam outlet systems and, more particularly, for a steam bar of a steam outlet system with multiple steam outlets.

BACKGROUND

Steam has long played a prominent role in bathing, wellness, and culture. For example, many cultures have utilized steam in their bathing and practices. Ancient Romans built steam rooms across the Roman Empire. Saunas, as we known them today, originate from Finland and many Finnish homes have their own sauna. Certain Native American tribes and groups utilize sweat lodges for physical and spiritual purification. As steam bathing becomes more widely available in individual homes and recreational centers, various accessories may enhance the steam bathing experience.

SUMMARY

In an embodiment, a steam outlet system may include, but is not limited to, a steam bar with at least one aperture for passing steam from a rear side to a front side of the steam bar. A front plate may be mounted to, and at a distance from, the front side of the steam bar. A steam diverting portion may extend the distance between the front side of the steam bar and the front plate over top edges of the at least one aperture.

One or more of the following features may be included. The steam bar may include two apertures. The steam bar may be configured to be coupled to at least one steam generator. The steam diverting portion may include downwardly facing edges on each end of the steam diverting portion. A mounting bracket may be configured to removably couple the steam bar to the at least one steam generator. Each aperture of the steam bar may be configured to receive a separate steam outlet pipe from the at least one steam generator. The steam bar may include a receptacle positioned within a top surface of the steam bar. The front plate may be removably mounted to the steam bar. The steam diverting portion may include a center portion that slopes downward and outward in opposite directions along the length of the front plate toward the edges of the front plate. The steam diverting portion may include downwardly facing edges on each end of the steam diverting portion.

According to another embodiment, a steam outlet system may include a steam bar with two apertures for passing steam from a rear side to a front side of the steam bar. A front plate may be mounted to, and at a distance from, the front side of the steam bar. A steam diverting portion may extend the distance between the front side of the steam bar and the front plate over top edges of each aperture.

One or more of the following features may be included. The steam bar may be configured to be coupled to at least one steam generator. A mounting bracket may be configured to removably couple the steam bar to the at least one steam generator. Each aperture of the steam bar may be configured to receive a separate steam outlet pipe from the at least one steam generator. The steam bar may include a receptacle positioned within a top surface of the steam bar. The front plate may be removably mounted to the steam bar. The steam diverting portion may include downwardly facing edges on each end of the steam diverting portion. The steam diverting portion may include a center portion that slopes downward and outward in opposite directions along the length of the front plate toward the edges of the front plate. the steam diverting portion is configured to direct steam out of the bottom of the steam bar.

According to yet another embodiment, a steam outlet system may include a steam bar with two apertures for passing steam from a rear side to a front side of the steam bar. A front plate may be mounted to, and at a distance from, the front side of the steam bar. A steam diverting portion may extend the distance between the front side of the steam bar and the front plate over top edges of each aperture. The steam diverting portion may include a center portion that slopes downward and outward in opposite directions along the length of the front plate toward the edges of the front plate and downwardly facing edges on each end of the steam diverting portion.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF EXAMPLE EMBODIMENTS

In general, consistent with the present disclosure, a steam outlet system is provided. For example, and referring generally to FIGS. 1 through 10 in some embodiments, a steam outlet system includes a steam bar with at least one aperture for passing steam from a rear side to a front side of the steam bar. The steam outlet system includes a front plate mounted to, and at a distance from, the front side of the steam bar. The steam outlet system also includes a steam diverting portion extending the distance between the front side of the steam bar and the front plate over top edges of the at least one aperture.

Figure 1:
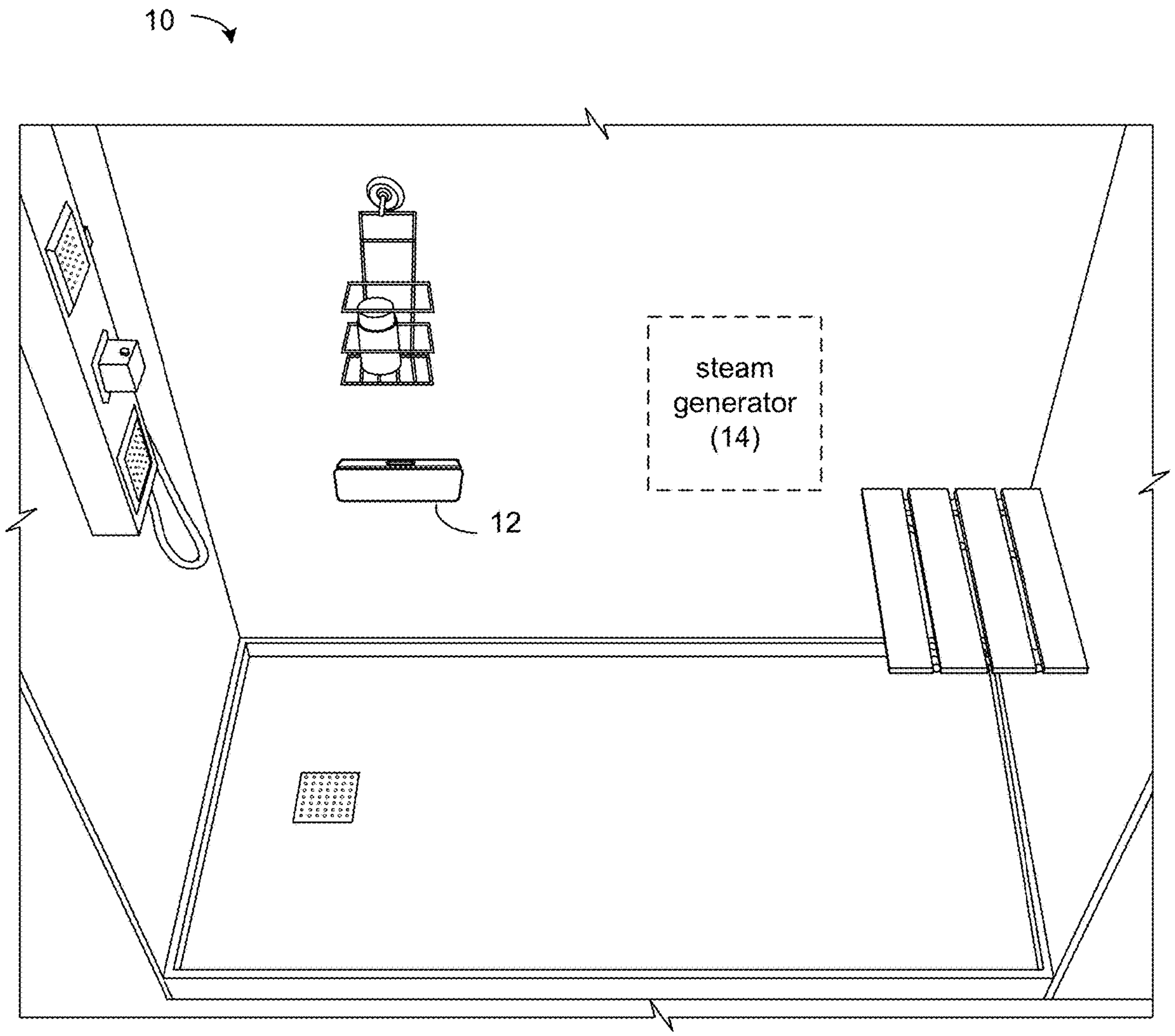
FIG. 1 is a diagrammatic view of a steam outlet system positioned in a shower unit, according to an example embodiment.

Referring to FIG. 1, there is shown a shower unit (e.g., shower unit 10) with a steam outlet system (e.g., steam outlet system 12). As will be discussed in greater detail below and in some embodiments, steam outlet system 12 is coupled to one or more steam generators (e.g., steam generator 14). In some embodiments, steam outlet system 12 may be positioned anywhere in shower unit 10 or any other room. For example, steam outlet system 12 may be utilized in other environments to direct steam from a steam generator to a target steam area. As will be discussed in greater detail below, steam outlet system 12 directs steam output from one or more steam outlets of steam generator 14 into shower unit 10.

Figure 2:
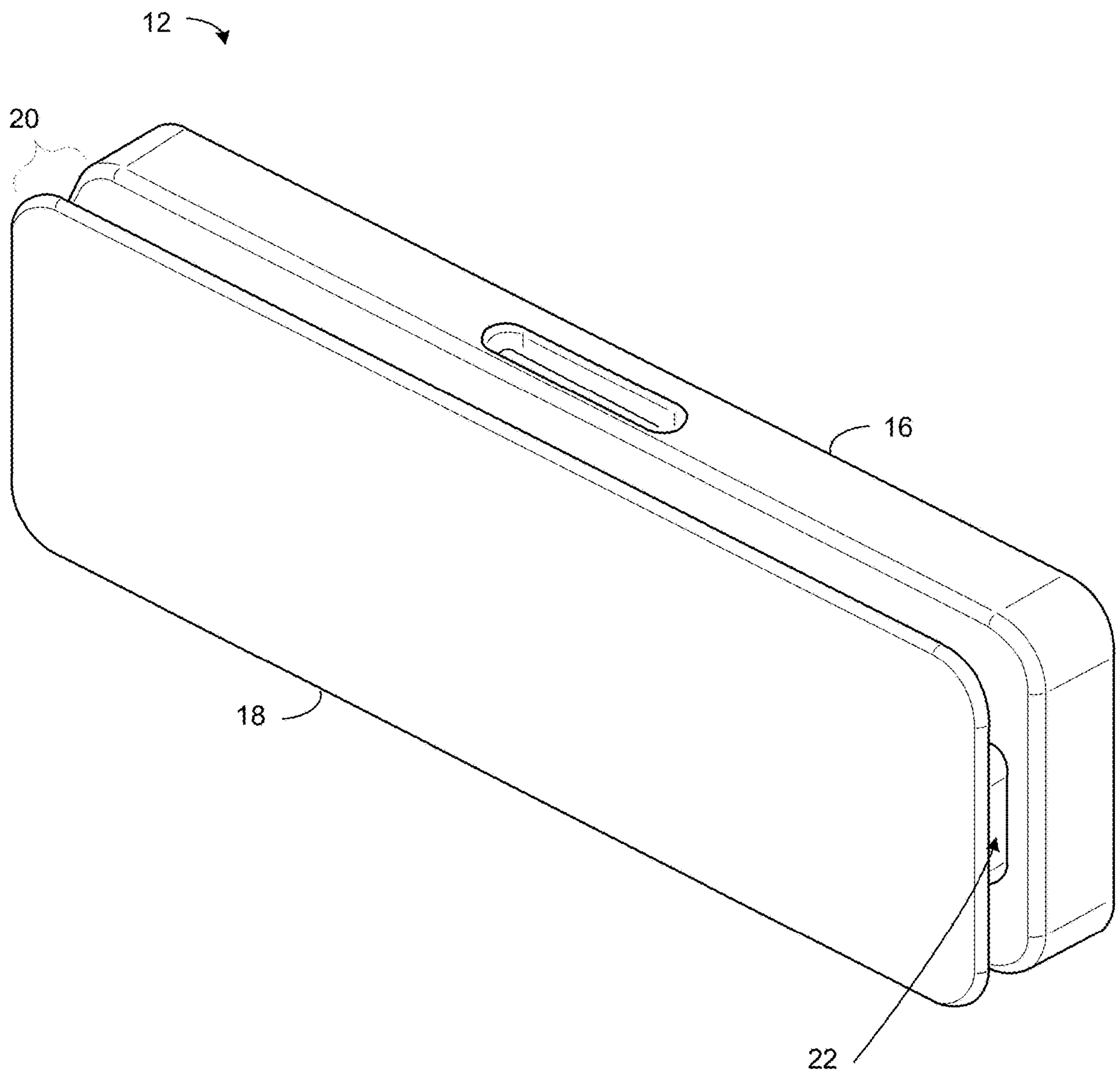
FIGS. 2-3 are perspective views of the steam outlet system, according to one or more example embodiments.

Referring also to FIG. 2, steam outlet system 12 includes a steam bar (e.g., steam bar 16) and a front plate (e.g., front plate 18) mounted to, and at a distance (e.g., distance 20) from, the front side of steam bar 16. Steam outlet system 12 also includes a steam diverting portion (e.g., steam diverting portion 22) extending the distance between the front side of steam bar 16 and front plate 18. In some embodiments, steam bar 16 is a generally rectangular structure made of various materials (e.g., metal, plastic, metal alloys, wood, etc.) that are water-resistant and steam-resistant. Water-resistant materials includes materials that can withstand repeated exposure or at least partial submersion in water. Steam-resistant materials includes materials that can withstand repeated exposure to steam. While steam bar 16 is shown as a generally rectangular structure, it will be appreciated that steam bar 16 may be implemented in various other forms or shapes (e.g., circular, triangular, etc.) within the scope of the present disclosure.

Figure 3:
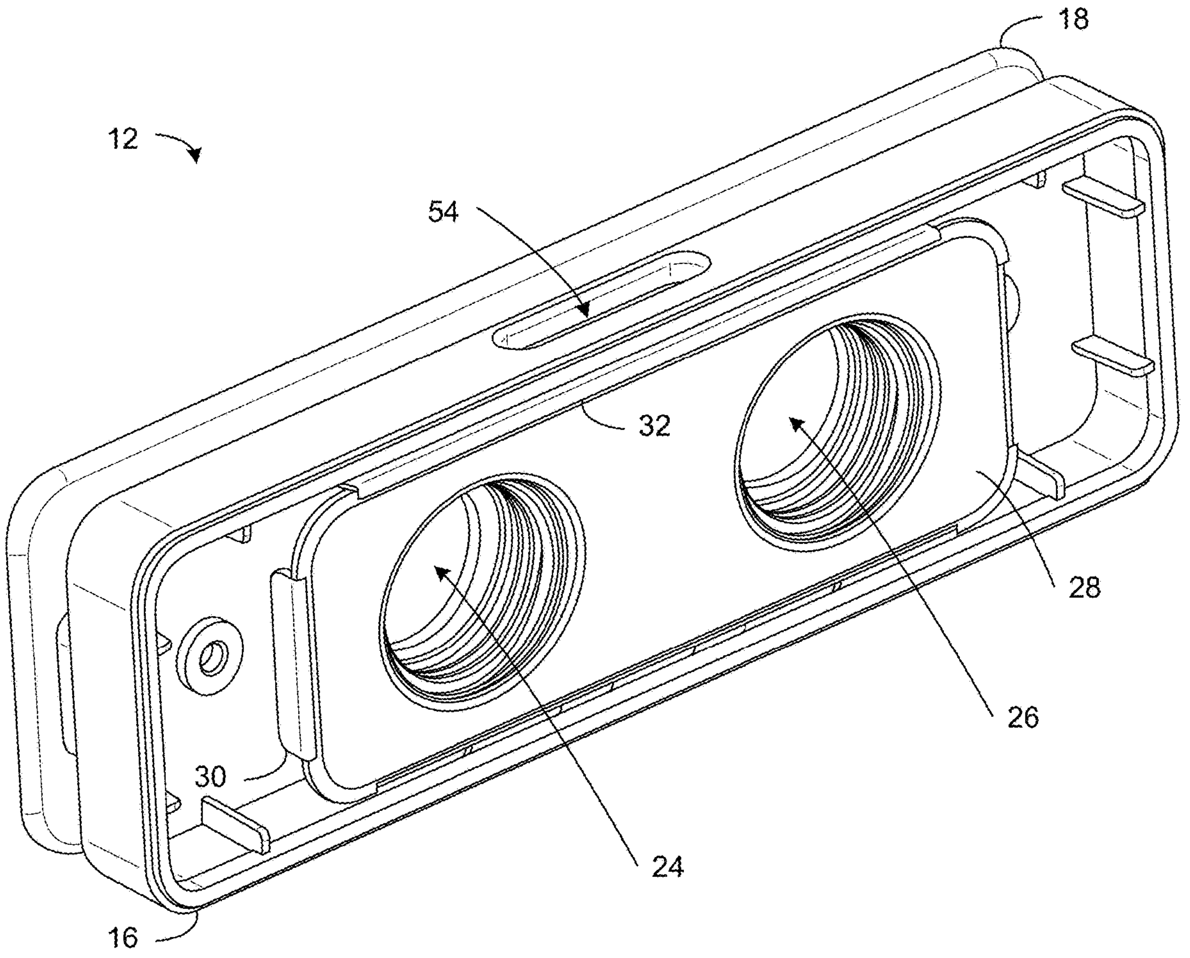

Referring also to FIG. 3, steam bar 16 includes one or more apertures (e.g., apertures 24, 26). In some embodiments and as shown in FIG. 3, steam bar 16 includes two apertures (e.g., apertures 24, 26). Apertures 24, 26 extend from a rear side of steam bar 16 to a front side of steam bar 16 to convey steam from a steam generator (e.g., steam generator 14) to steam diverting portion 22.

In some embodiments, steam outlet system 12 includes a mounting bracket (e.g., mounting bracket 28) configured to removably couple steam bar 16 to the at least one steam generator (e.g., steam generator 14). In some embodiments, mounting bracket 28 is a portion of metal, plastic, or other rigid material. Mounting bracket 28 includes corresponding apertures (e.g., apertures 24, 26) configured to engage or partially receive a steam outlet pipe from the at least one steam generator (e.g., steam generator 14).

As shown in FIG. 3, steam bar 16 may include one or more fasteners (e.g., fasteners 30, 32) configured to removably couple steam bar 16 to the at least one steam generator (e.g., steam generator 14). As shown in FIG. 3, fasteners 30, 32 are wrapped at least partially around the edges of mounting bracket to removably retain steam bar 16 against mounting bracket 28. In some embodiments, fasteners 30, 32 define a portion of a push in assembly configured to removably couple steam bar 16 to steam generator 14 by pressing or pushing steam bar 16 against mounting bracket 28 until fasteners 30, 32 are pressed into contact with the external edges of mounting bracket 28. However, it will be appreciated that other types of fasteners or fastener systems may be used to removably couple steam bar 16 to mounting bracket 28 within the scope of the present disclosure.

Figure 4:
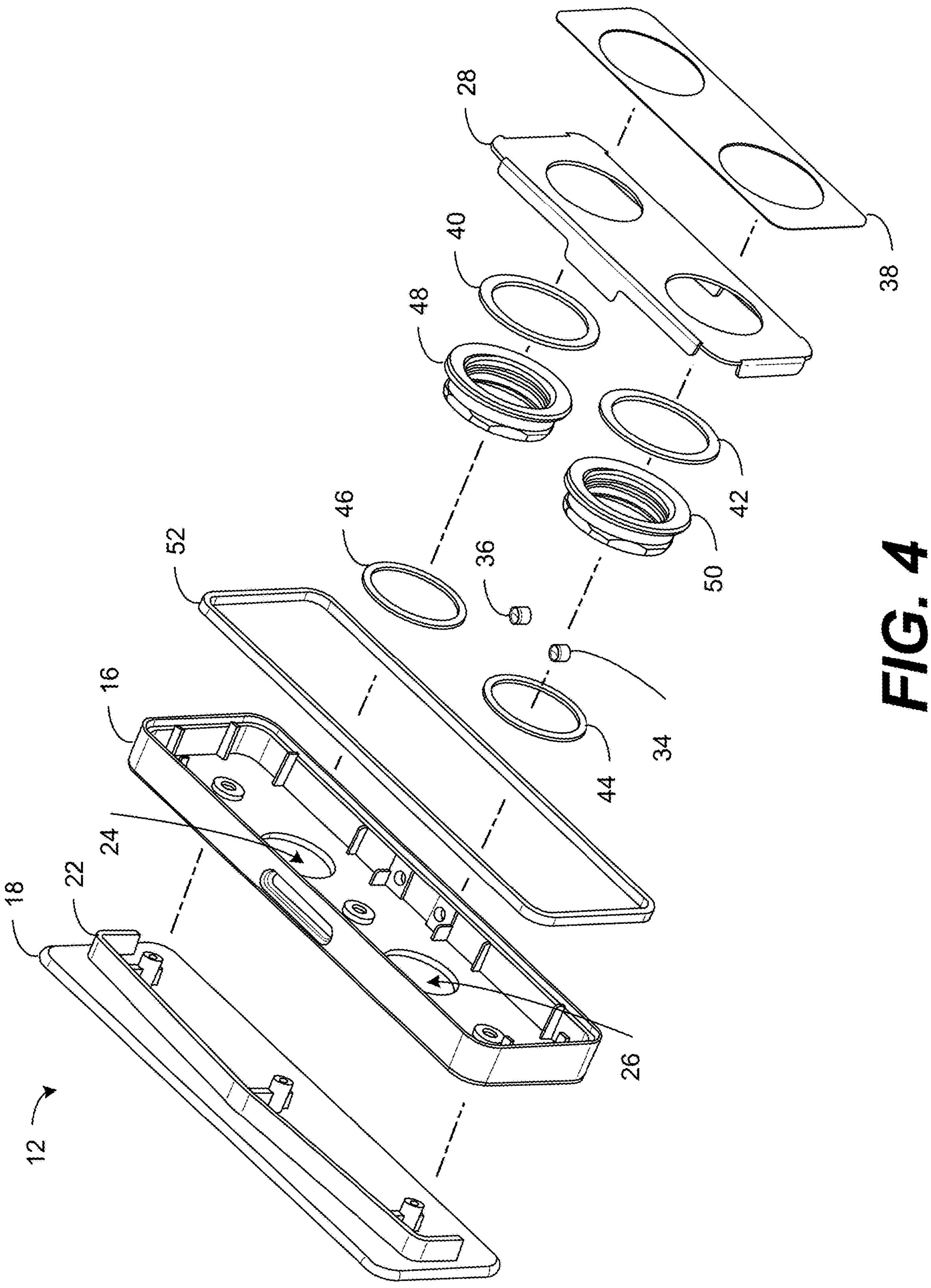
FIG. 4 is an exploded view of the steam outlet system, according to an example embodiment.
Figure 5:
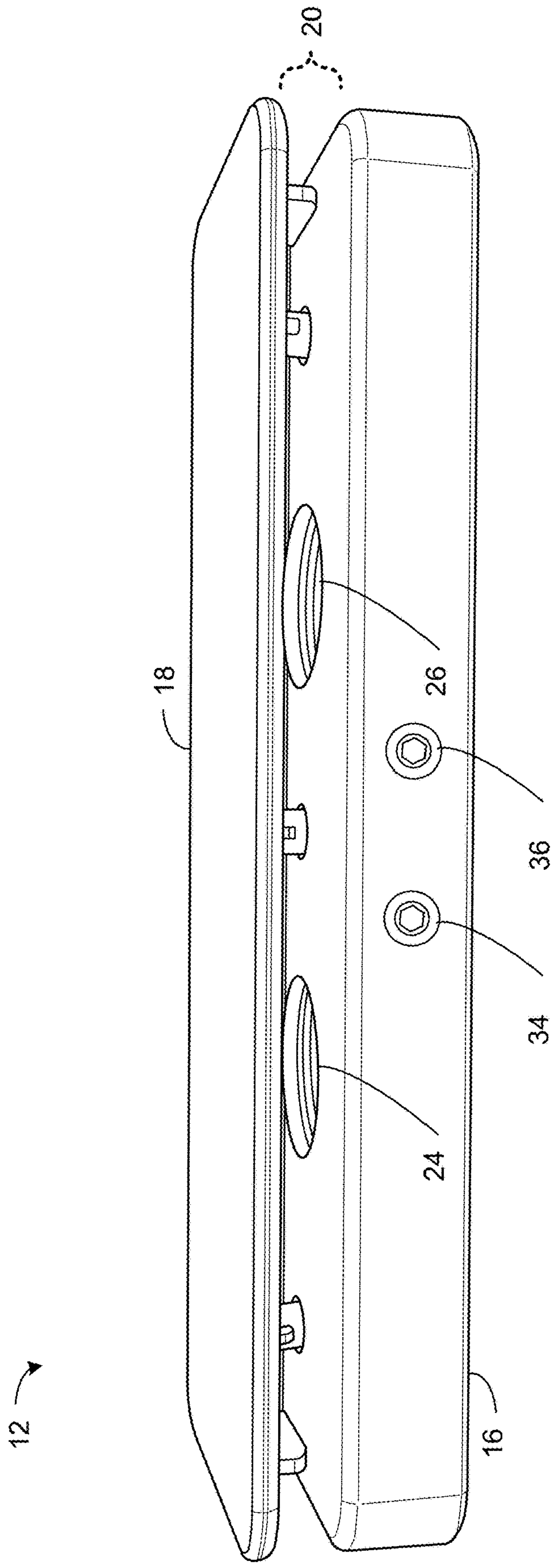
FIG. 5 is a bottom perspective view of the steam outlet system, according to an example embodiment.

Referring also to FIG. 4, an exploded assembly view of steam outlet system 12 is shown. In this example, mounting bracket 28 includes fasteners configured to engage particular portions of steam bar 16. In some embodiments, a front side of mounting bracket 28 include tab portions configured to engage receiving slots within steam bar 16. Steam bar 16 may include fasteners (e.g., fasteners 34, 36) configured to engage the tab portions. For example, fasteners 34, 36 may include screws configured to press against and/or engage corresponding apertures in the tab portions of mounting bracket 28. Referring also to FIG. 5, these fasteners (e.g., fasteners 34, 36) can be seen from the bottom view of steam bar 16.

Referring again to FIG. 4, steam outlet system 12 may include an adhesive portion (e.g., double-sided adhesive portion 38) that is applied over one or more steam outlet pipes from the at least one steam generator (e.g., steam generator 14). For example, adhesive portion 38 may be applied on a wall and include an aperture lining up with each steam outlet pipe. Mounting bracket 28 may then be pressed against adhesive portion 38 with the apertures of mounting bracket 28 lining up with each steam outlet pipe. In some embodiments, gaskets (e.g., gaskets 40, 42, 44, 46) and nuts (e.g., nuts 48, 50) may be used to couple mounting bracket 28 and steam bar 16 with each steam outlet pipe of steam generator 14. In some embodiments, steam bar 16 includes a seal (e.g., seal 52) that extends around the edges of steam bar 16 where steam bar 16 contacts a wall or other surface within shower unit 10. In this manner, steam bar 16 may be sealed from water and/or other particles entering the interior space of steam bar 16.

Figure 6:
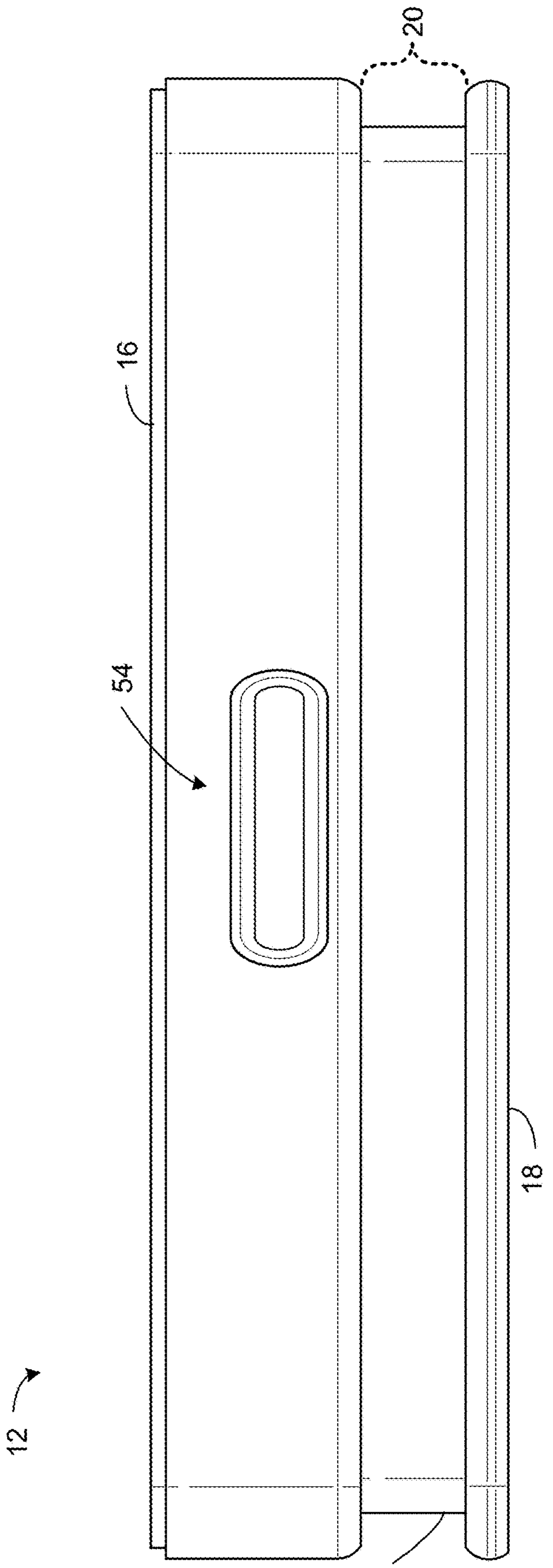
FIG. 6 is a top view of the steam outlet system, according to an example embodiment.

Referring also to FIG. 6, steam bar 16 may include a receptacle (e.g., receptacle 54) positioned within or on a top surface of steam bar 16. In some embodiments, receptacle 54 is configured to hold various liquids such as aroma oils that evaporate into the air while steam outlet system 12 passes steam into the shower unit 10. In this manner, steam outlet system 12 provides aroma oils or other evaporative liquids to the steam generated by steam generator 14.

Figure 7:
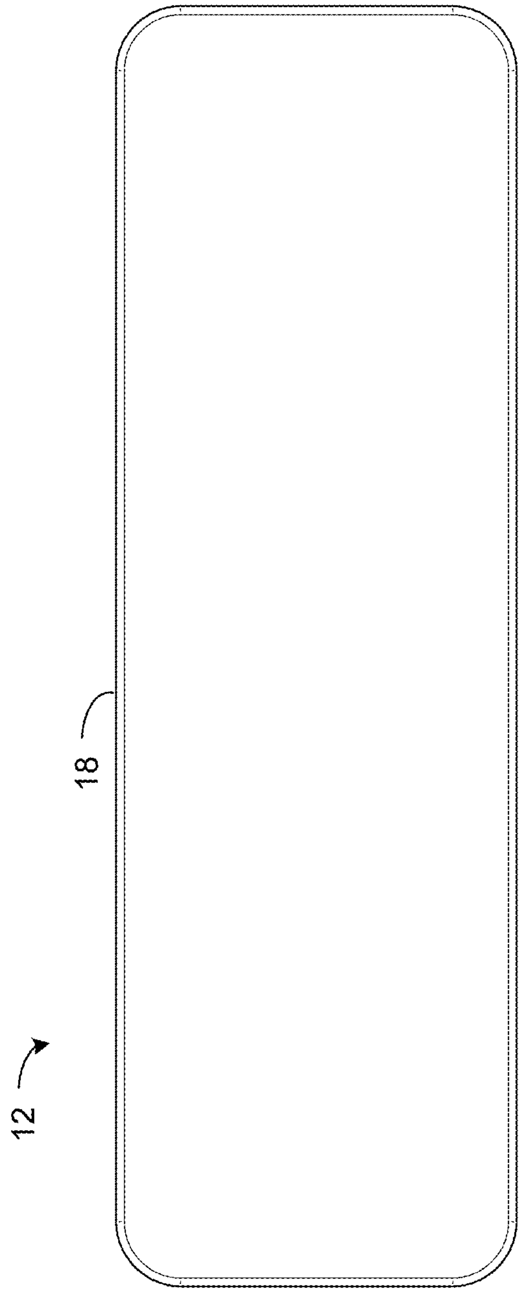
FIG. 7 is a front view of the steam outlet system, according to an example embodiment.

Referring also to FIG. 7, steam outlet system 12 may include a front plate (e.g., front plate 18). In some embodiments, front plate 18 may be formed from metal, plastic, metal alloy, etc. Referring again to FIGS. 2 and 7 and in some embodiments, front plate 18 is mounted to, and at a distance (e.g., distance 20) from, the front side of steam bar 16. Distance 20 may be defined by the width of steam diverting portion 22. In some embodiments, front plate 18 may be generally flat and unadorned. Front plate 18 may generally have the same shape and dimensions as steam bar 16 so as to substantially cover steam bar 16.

Figure 8:
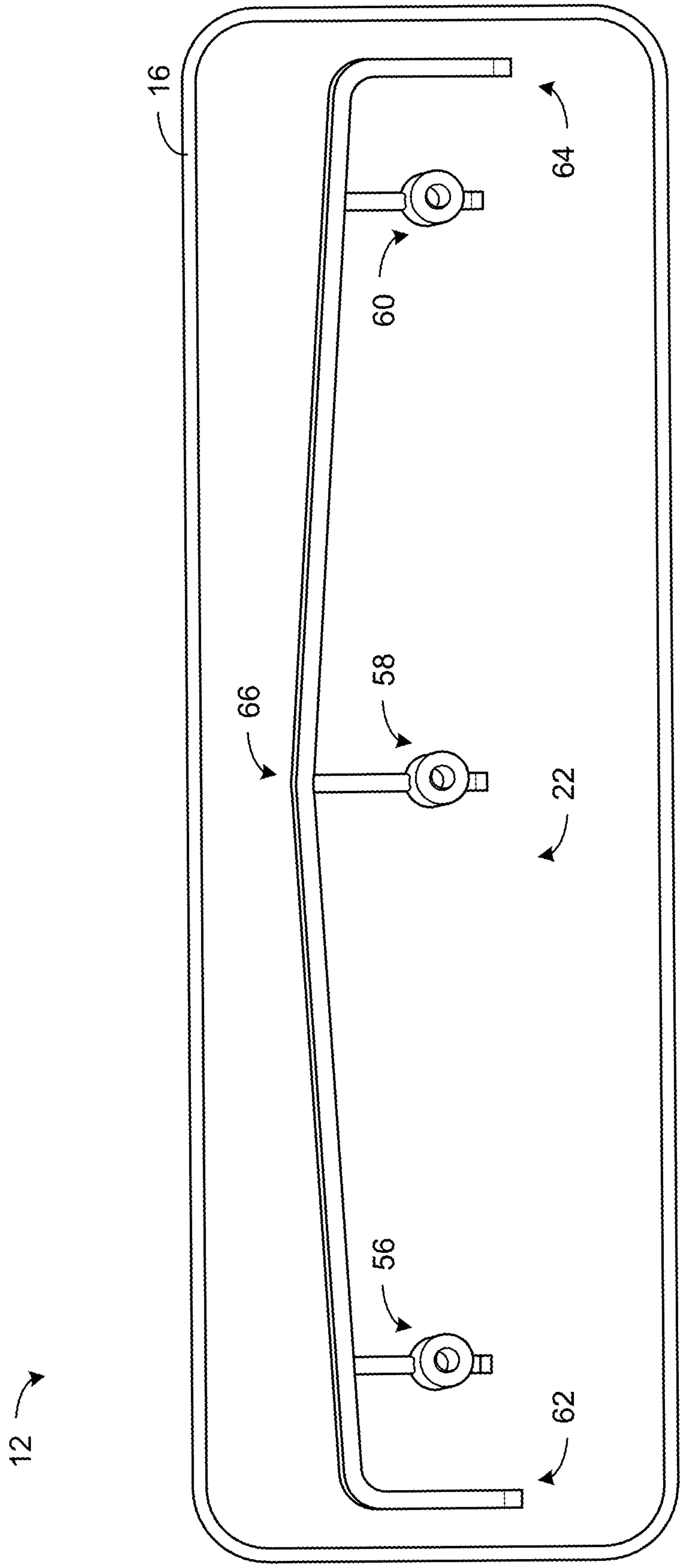
FIG. 8 is a rear view of the front plate and steam diverting portion, according to an example embodiment.

Referring also to FIG. 8 and in some embodiments, front plate 18 may be mounted or coupled to steam bar 16. For example, front plate 18 may be permanently affixed to steam bar 16. In another example and in some embodiments, front plate 18 may be removable mounted to steam bar 16. For example and as shown in FIG. 8, front plate 18 may include various fasteners (e.g., fasteners 56, 58, 60) to removably couple front plate 18 to steam bar 16. For example, fasteners 56, 58, 60 may include screws, bolts, or other types of fasteners configured to engage corresponding features of steam bar 16. In one example, fasteners 56, 58, 60 are screws that extend outward from the rear side of front plate 18 and engage corresponding threads of steam bar 16. In this manner, front plate 18 is removably mounted to steam bar 16.

Referring again to FIG. 8 and in some embodiments, the steam outlet system (e.g., steam outlet system 12) includes a steam diverting portion (e.g., steam diverting portion 22) extending the distance between the front side of steam bar 16 and front plate 18 over top edges of the at least one aperture (e.g., apertures 24, 26). Steam diverting portion 22 is a portion made of metal, plastic, metal alloy, or any other rigid material that extends generally horizontally over the top of the at least one aperture (e.g., apertures 24, 26) of steam bar 16. In this manner, steam diverting portion 22 is configured to direct or divert steam towards the bottom of steam bar 16 (e.g., out of the space between steam bar 16 and front plate 18 shown in FIG. 5). In some embodiments, steam diverting portion 22 includes downwardly facing edges (e.g., edges 62, 64) on each end of steam diverting portion 22. In this manner, steam diverting portion 22 diverts steam downward toward the bottom space between steam bar 16 and front plate 18 shown in FIG. 5.

In some embodiments, steam diverting portion 22 includes a center portion (e.g., center portion 66) that slopes downward and outward in opposite directions along the length of front plate 18 toward the edges of front plate 18. In some embodiments, each edge may be sloped at an angle ranging from 0° to 90° relative to center point 66. Each edge may have the same slope or different slopes. In one example, each edge has the same slope ranging from 10° to 25° downwards from center point 66. It will be appreciated that the edges of steam diverting portion 22 may be sloped at any angle relative to center point 66 within the scope of the present disclosure. In this manner, the sloped lip of steam diverting portion 22 prevents steam from going upwards while allowing any condensation to run off either sloped edge of steam diverting portion 22.

Figure 9:
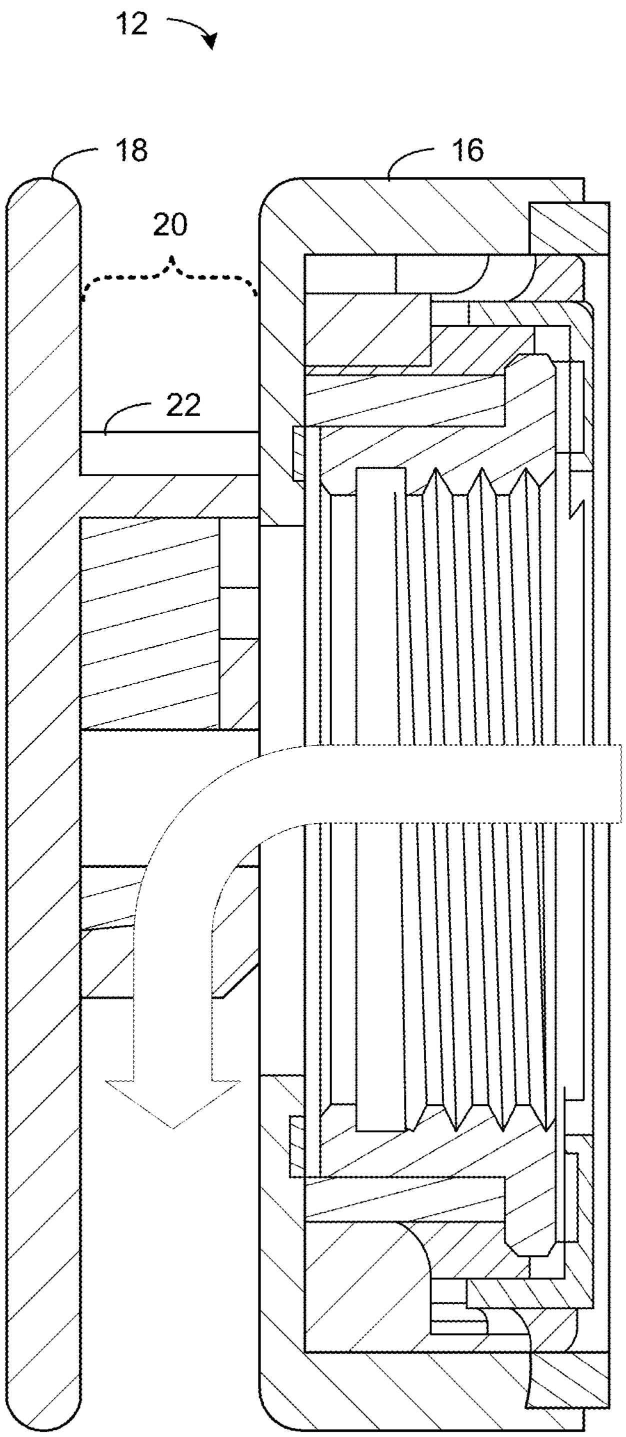
FIG. 9 is a left side cross-sectional view of the steam outlet system demonstrating the passage of steam through the steam outlet system.

As discussed above, steam diverting portion 22 is configured to direct steam out of the bottom of steam bar 16. Referring also to FIG. 9, a cross-sectional view of steam outlet system 12 is shown with an arrow representing the direction of steam from steam generator 14 through apertures 24, 26 of steam bar 16 into the space formed between steam bar 16 and front plate 18. Steam diverting portion 22 diverts the steam downward and out of the bottom of steam outlet system 12.

Figure 10:
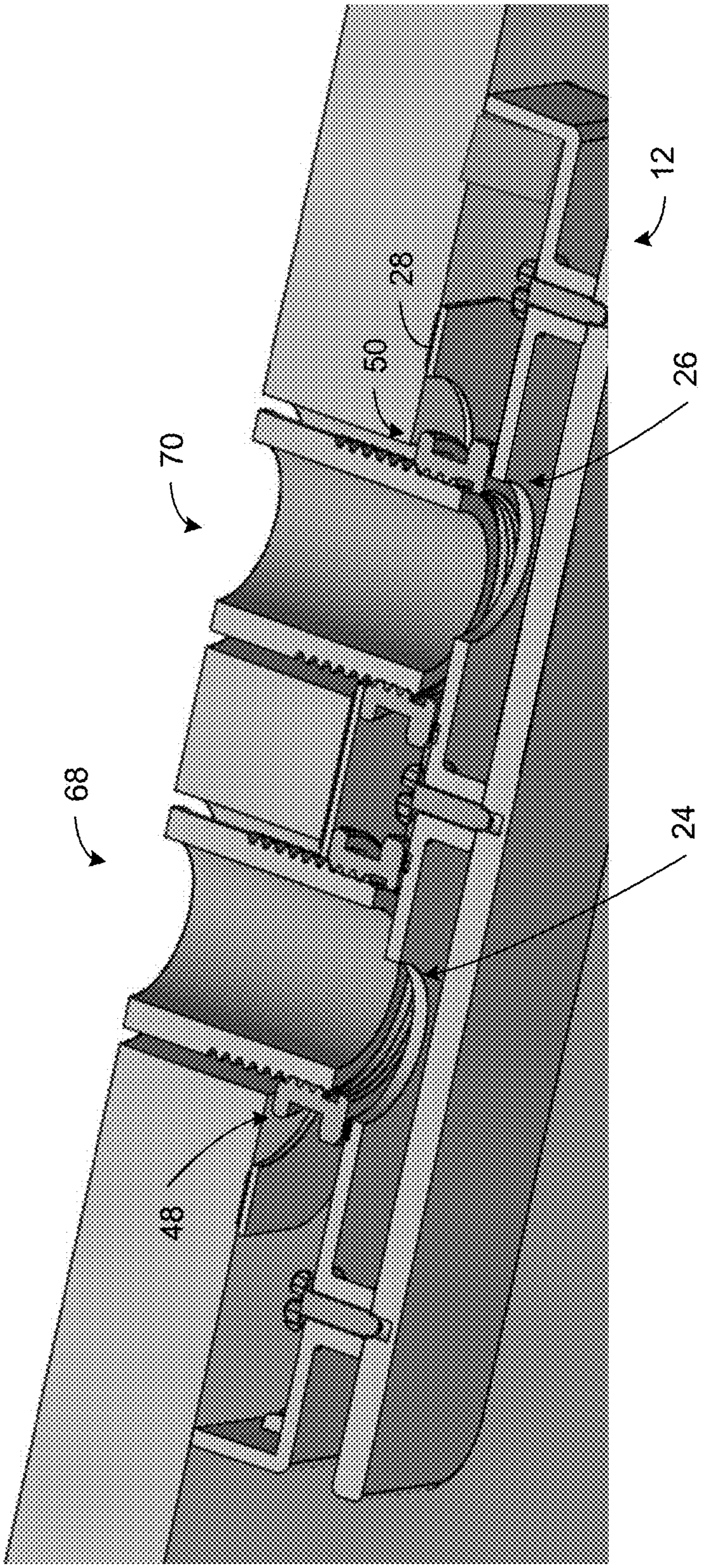
FIG. 10 is a top cross-sectional view of the steam outlet system demonstrating the coupling of steam outlet pipes within the steam outlet system.

Referring also to FIG. 10, steam outlet system 12 allows for flexibility in the distance between the incoming steam outlet pipes. For example, the distance between multiple steam outlet pipes may not always be the same. As such, by providing larger (i.e., larger than the expected steam outlet pipe diameter) openings in the mounting plate along with large nuts and gaskets there is flexibility in case the steam outlet pipe does not completely line up with the steam bar's openings. As shown in FIG. 10, steam outlet pipes 68 and 70 pass through openings in mounting bracket 28 and into nuts 48 and 50, respectively. With gaskets 46 and 44 between nuts 48 and 50 and the back of steam bar 16, a seal is formed between the ends of nuts 48 and 50 and openings 24 and 26 even though steam outlet pipes 68 and 70 are not exactly aligned with openings 24 and 26 of steam bar 16. In this manner, steam outlet system 12 allows for variability in the distance between steam outlet pipes relative to the openings in the steam outlet system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments have been described. Having thus described the disclosure of the present application in detail and by reference to embodiments thereof, it will be apparent that modifications and variations are possible without departing from the scope of the disclosure defined in the appended claims.

What is claimed is:

1. A steam outlet system comprising:
a steam bar with at least one aperture for passing steam from a rear side to a front side of the steam bar;
a front plate mounted to, and at a distance from, the front side of the steam bar; and
a steam diverting portion extending the distance between the front side of the steam bar and the front plate over top edges of the at least one aperture.

2. The steam outlet system of claim 1, wherein the steam bar includes two apertures.

3. The steam outlet system of claim 1, wherein the steam bar is configured to be coupled to at least one steam generator.

4. The steam outlet system of claim 3, further comprising:
a mounting bracket configured to removably couple the steam bar to the at least one steam generator.

5. The steam outlet system of claim 3, wherein each aperture of the steam bar is configured to receive a separate steam outlet pipe from the at least one steam generator.

6. The steam outlet system of claim 1, wherein the steam bar includes a receptacle positioned within a top surface of the steam bar.

7. The steam outlet system of claim 1, wherein the front plate is removably mounted to the steam bar.

8. The steam outlet system of claim 1, wherein the steam diverting portion is configured to direct steam out of the bottom of the steam bar.

9. The steam outlet system of claim 1, wherein the steam diverting portion includes downwardly facing edges on each end of the steam diverting portion.

10. The steam outlet system of claim 1, wherein the steam diverting portion includes a center portion that slopes downward and outward in opposite directions along the length of the front plate toward the edges of the front plate.

11. A steam outlet system comprising:
a steam bar with two apertures for passing steam from a rear side to a front side of the steam bar;
a front plate mounted to, and at a distance from, the front side of the steam bar; and
a steam diverting portion extending the distance between the front side of the steam bar and the front plate over top edges of each aperture.

12. The steam outlet system of claim 11, wherein the steam bar is configured to be coupled to at least one steam generator.

13. The steam outlet system of claim 12, further comprising:
a mounting bracket configured to removably couple the steam bar to the at least one steam generator.

14. The steam outlet system of claim 12, wherein each aperture of the steam bar is configured to receive a separate steam outlet pipe from the at least one steam generator.

15. The steam outlet system of claim 11, wherein the steam bar includes a receptacle positioned within a top surface of the steam bar.

16. The steam outlet system of claim 11, wherein the front plate is removably mounted to the steam bar.

17. The steam outlet system of claim 11, wherein the steam diverting portion includes downwardly facing edges on each end of the steam diverting portion.

18. The steam outlet system of claim 11, wherein the steam diverting portion includes a center portion that slopes downward and outward in opposite directions along the length of the front plate toward the edges of the front plate.

19. The steam outlet system of claim 11, wherein the steam diverting portion is configured to direct steam out of the bottom of the steam bar.

20. A steam outlet system comprising:

a steam bar with two apertures for passing steam from a rear side to a front side of the steam bar;

a front plate mounted to, and at a distance from, the front side of the steam bar; and a steam diverting portion extending the distance between the front side of the steam bar and the front plate over top edges of each aperture, wherein the steam diverting portion includes a center portion that slopes downward and outward in opposite directions along the length of the front plate toward the edges of the front plate and downwardly facing edges on each end of the steam diverting portion.

* * * * *